(12) United States Patent
Tigli et al.

(10) Patent No.: US 8,218,918 B2
(45) Date of Patent: Jul. 10, 2012

(54) OPTICAL FIBER SWITCH WITH MOVABLE LENS

(75) Inventors: Hus Tigli, La Jolla, CA (US); Matthew Last, San Diego, CA (US); Yoshi Taketomi, San Diego, CA (US)

(73) Assignee: Trex Enterprises Corp, San Diego, CA (US)

( * ) Notice: Subject to any disclaimer, the term of this patent is extended or adjusted under 35 U.S.C. 154(b) by 0 days.

(21) Appl. No.: 12/661,622

(22) Filed: Mar. 18, 2010

(65) Prior Publication Data

US 2011/0206317 A1    Aug. 25, 2011

Related U.S. Application Data

(63) Continuation-in-part of application No. 11/728,435, filed on Mar. 26, 2007, now Pat. No. 7,734,127, and a continuation-in-part of application No. 12/462,641, filed on Aug. 5, 2009.

(60) Provisional application No. 61/210,473, filed on Mar. 18, 2009.

(51) Int. Cl.
*G02B 6/26* (2006.01)

(52) U.S. Cl. ............. 385/17; 385/18; 385/33; 385/115; 385/116

(58) Field of Classification Search .................... 385/15, 385/16, 17, 18, 24, 31, 33, 34, 115, 116, 385/25

See application file for complete search history.

(56) References Cited

U.S. PATENT DOCUMENTS

| | | | | |
|---|---|---|---|---|
| 6,384,916 | B1 * | 5/2002 | Furtak | 356/369 |
| 6,526,194 | B1 * | 2/2003 | Laor | 385/18 |
| 6,636,653 | B2 * | 10/2003 | Miracky et al. | 385/14 |
| 6,657,771 | B2 * | 12/2003 | Okayama | 359/290 |
| 6,668,108 | B1 * | 12/2003 | Helkey et al. | 385/18 |
| 7,734,127 | B2 * | 6/2010 | Korevaar et al. | 385/17 |
| 2011/0206317 | A1 * | 8/2011 | Tigli et al. | 385/17 |

* cited by examiner

*Primary Examiner* — Brian Healy
(74) *Attorney, Agent, or Firm* — John R. Ross

(57) ABSTRACT

A scalable optical switch especially useful for switching multimode beams carried by optical fibers. Light from an input fiber is focused by a lens which is moved in an x-y direction perpendicular to the beam direction in order to switch the beam from one output fiber to a different fiber. In preferred embodiments the beam can be directed to any one of as many as 90 output fibers. Techniques for scaling the switch to produce N×N switches with N being large are described. Embodiments of the present invention can also be utilized to create more elaborate fiber optical switches such as an N×N switch and a $N^2$×N switch.

17 Claims, 5 Drawing Sheets

$N^2$ x N down-select switch made from 90x1 switch elements

3X3 Switch made from 1x3 switch elements

OPTICAL FIBER SWITCH WITH MOVABLE LENS

CROSS REFERENCE TO RELATED APPLICATIONS

The present application is a continuation in part of U.S. patent application Ser. No. 11/728,435, Optical Switch Module, filed Mar. 26, 2007 now U.S. Pat. No. 7,734,127 and U.S. patent application Ser. No. 12/462,641, filed Aug. 5, 2009, both of which are incorporated herein by reference. This application also claims the benefit of Provisional Patent Application Ser. No. 61/210,473 filed Mar. 18, 2009.

FIELD OF THE INVENTION

The present invention is related to optical switches and in particular to fiber optic switches.

BACKGROUND OF THE INVENTION

Multi-mode optical fiber is a type of optical fiber mostly used for communication over shorter distances, such as within a building or on a campus. Typical multimode links have data rates of 10 Mbit/s to 10 Gbit/s over link lengths of up to 600 meters—more than sufficient for the majority of premises applications. The equipment used for communications over multi-mode optical fiber is much less expensive than that for single-mode optical fiber. Typical transmission speed/distance limits are 100 Mbit/s for distances up to 2 km, 1 Gbit/s to 500-600 m, and 10 Gbit/s to 300 m.

Multimode fiber has higher "light-gathering" capacity than single-mode optical fiber. In practical terms, the larger core size simplifies connections and also allows the use of lower-cost electronics such as light-emitting diodes and vertical-cavity surface-emitting lasers which operate at the 850 nm wavelength (single-mode fibers used in telecommunications operate at 1310 or 1550 nm and require more expensive laser sources. Multimode fibers exist for nearly all visible wavelengths of light). However, compared to single-mode fibers, the limit on speed times distance is lower. Because multimode fiber has a larger core-size than single mode fiber, it supports more than one propagation mode; hence it is limited by modal dispersion, while single mode is not.

Automatic All Optical Cross Connect Switches

Recently, a number of optical cross connect switches have become available for switching optical signals directly from one fiber to another, thereby eliminating the need to convert the optical signal to an interim electrical signal. These optical switches incorporate various optical switch elements, such as mirrors, prisms, fiber collimators, and complicated drive mechanisms, to route optical signals through the switch. For some optical switches, MEMS mirrors have been utilized. All optical switches are described in the following patents recently issued which contain features similar to some of the features of the present invention: U.S. Pat. No. 7,190,509, Optically Addressed MEMS and U.S. Pat. No. 7,177,497, Porous Silicon Filter for Wavelength Multiplexing and De-Multiplexing, both of which are incorporated herein by reference.

Applications of All Optical Automatic Cross Connect Switches

Known uses of all optical cross connect switches include (1) use as the principal component in a automated fiber patch panel, (2) use a component of a reconfigurable optical add drop multiplexer system and (3) use for automatic testing and measurement of optical components and systems.

Test and Measurement

Automated all optical cross connect switches can greatly simplify testing of optical components especially components of typical communication networks simultaneously carrying millions of messages.

The Need

Optical fiber switches tend to be very expensive. In many applications the advantages that an optical fiber switch would bring are far outweighed by the cost. What is needed is a low-cost multimode optical fiber switch.

SUMMARY OF THE INVENTION

The present invention provides a scalable optical switch especially useful for switching multimode beams carried by optical fibers. Light from an input fiber is focused by a lens which is moved in an x-y direction perpendicular to the beam direction in order to switch the beam from one output fiber to a different fiber. In preferred embodiments the beam can be directed to any one of as many as 90 output fibers. Techniques for scaling the switch to produce N×N switches with N being large are described. Embodiments of the present invention can also be utilized to create more elaborate fiber optical switches such as an $N^2 \times N^2$ switch and a $N^2 \times N$ switch.

DETAILED DESCRIPTION OF PREFERRED EMBODIMENTS

Movable Lens

Figure 1:
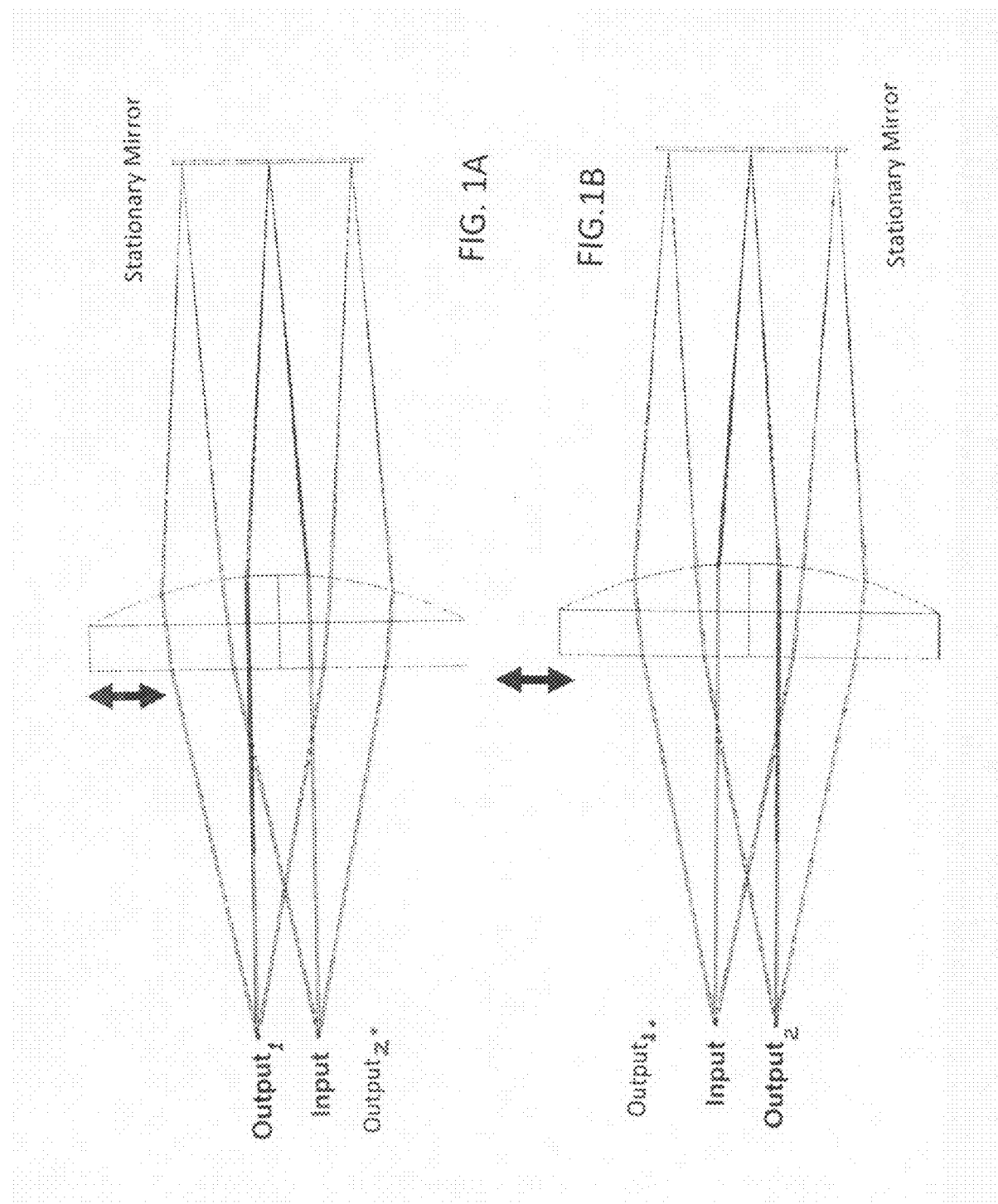
FIGS. 1A and 1B demonstrate how a moving lens can direct a light beam form one fiber into multiple fibers.
Figure 2:
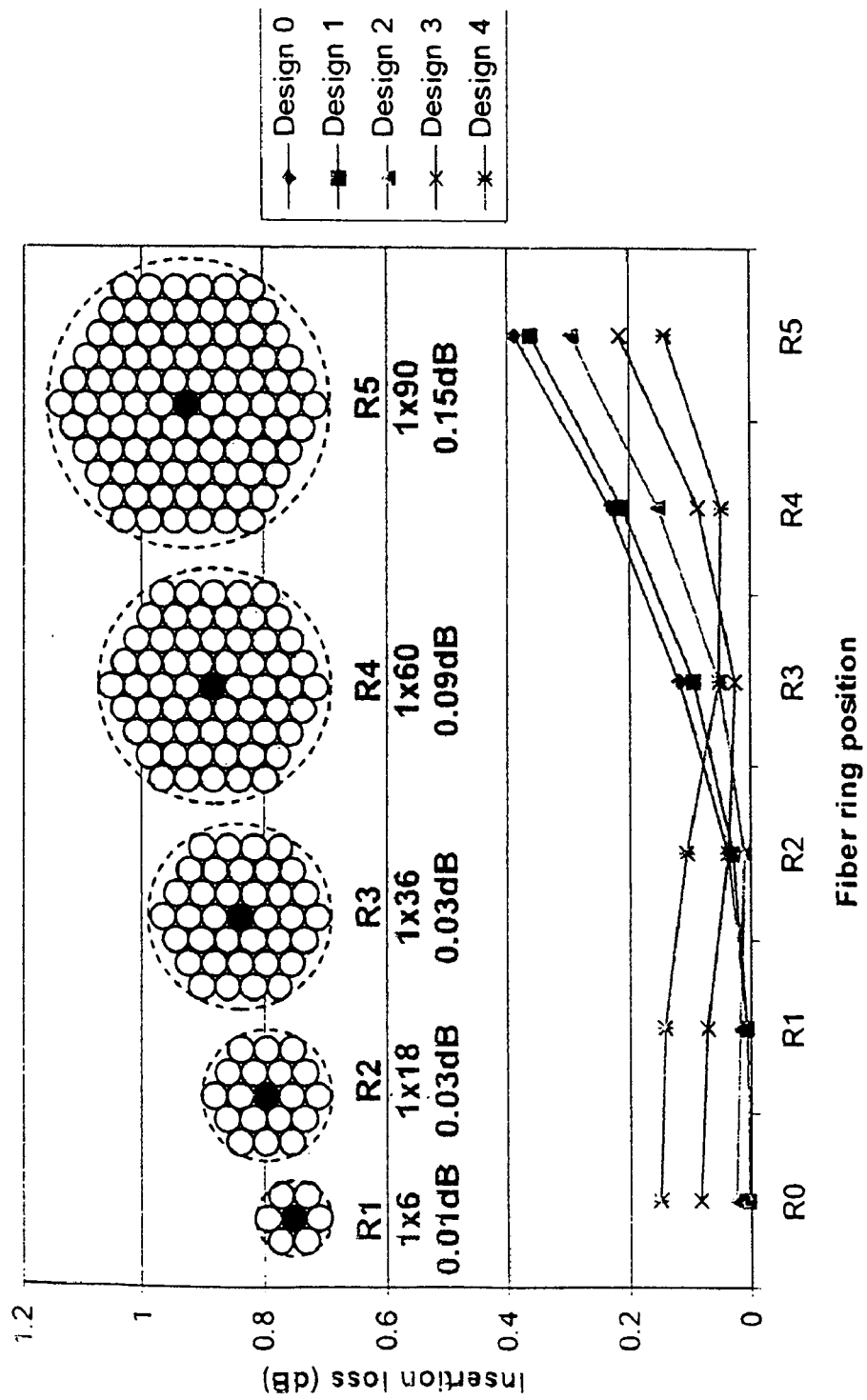
FIG. 2 show five fiber bundles useful in the present invention.
Figure 3:
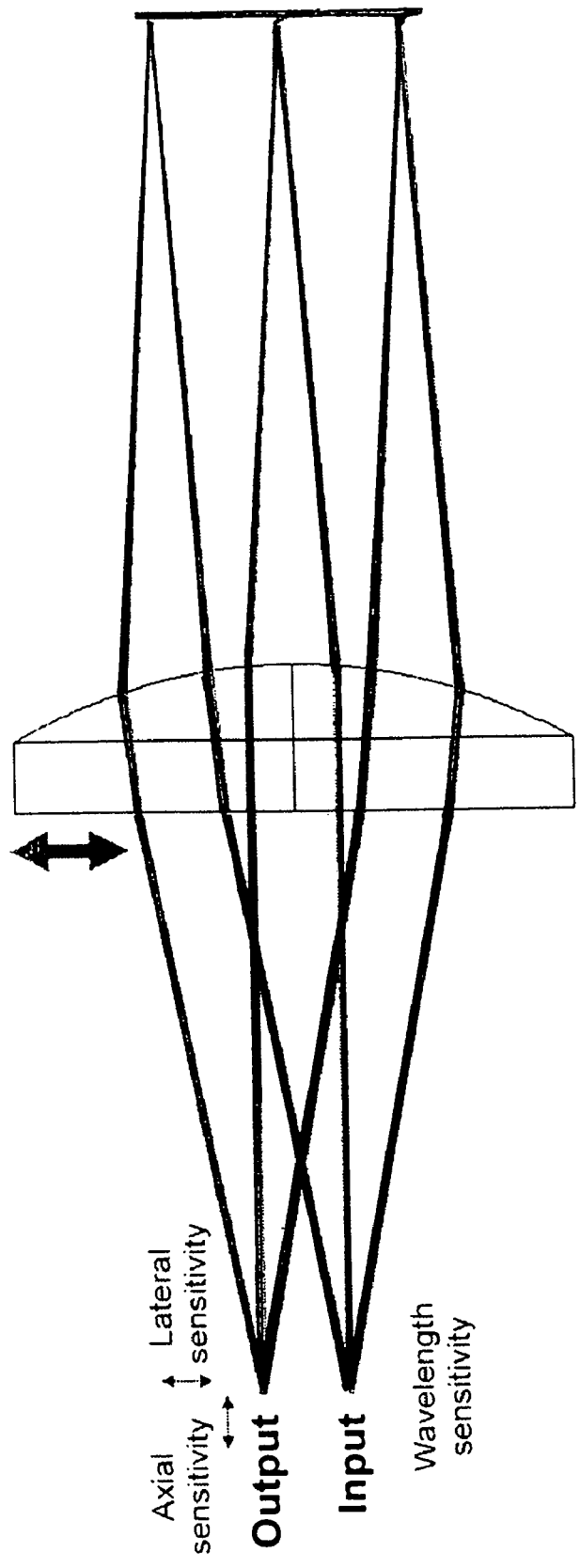
FIG. 3 portrays examples of tolerance studies performed by Applicants.

FIGS. 1A, 1B and 2 describe a preferred embodiment which utilizes a movable lens to direct a multimode light beam from an input fiber to one of a plurality of output fibers. The out-going beam from the input fiber is incident on the lens in a telecentric manner, then tilted toward the stationary mirror and reflected back to the lens in pseudo symmetric path. The returned beam will hit the output fiber located at twice the distance of the lens movement. As shown in FIG. 2 the input fiber shown black is located in the center of a bundle of output fibers. In the drawing the output fibers can be 6, 18, 36, 60 or 90. Other numbers of output fibers are possible. For example a bundle could contain 9 output fibers. More than 90 output fibers could be utilized with some additional dB loss. FIGS. 1A and 1B demonstrate how a movement of the movable lens in a direction perpendicular to the input beam causes the beam to be switched from output fiber 1 as shown in FIG. 1A to output fiber 2 as shown in FIG. 1B. Applicants have simulated the optics and calculated the dB loss associated with the optics as shown in FIGS. 2. The dB results are shown in the graph in FIG. 2 for 5 different lens designs in which the focus and dimensions are somewhat different in each design. The result shown in FIG. 2 graph is that the dB loss (with Design 4) is less than about 0.2 dB for 60 fibers and 0.4 dB for 90 fibers. FIGS. 1A, 1B and 2 refer to 1×N switches with one input fiber and N output fibers.

Figure 4:
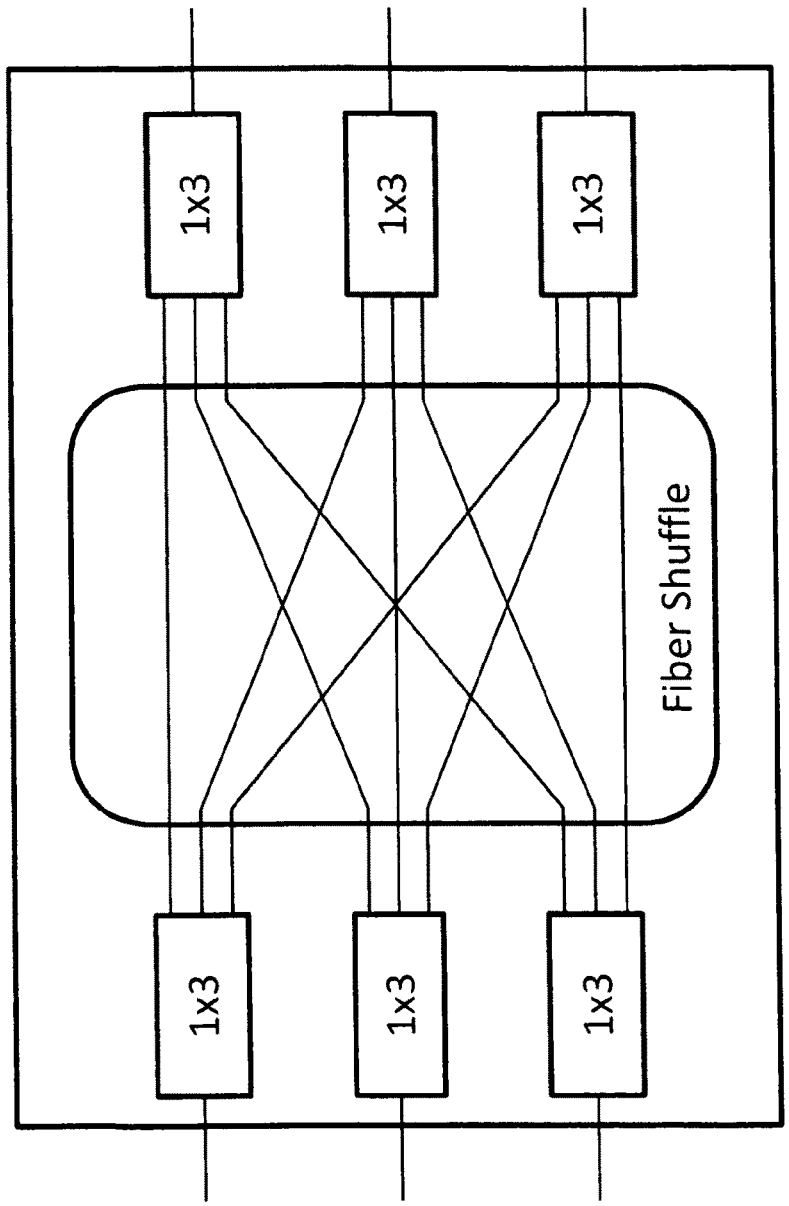
FIG. 4 shows a 3×3 switch.
Figure 5:
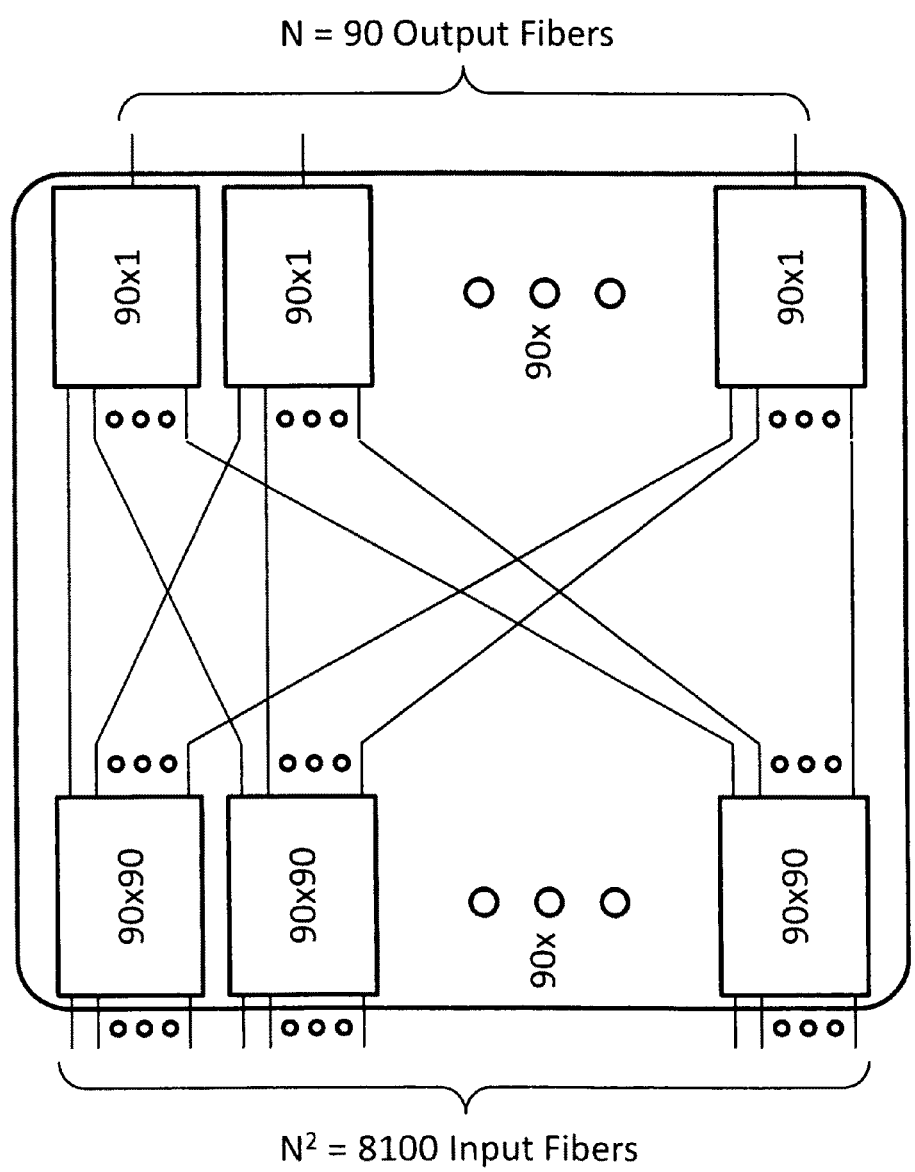
FIG. 5 shows aN 8100×90, $N^2 \times N$ switch.

This invention can easily be utilized to create an N×N switch. For a 3×3 case, six switches are used as shown in FIG. 4. Three are set up as indicated for input of three fibers and three are reversed to function as output fibers as shown in FIG. 4. Each of the 9 output fibers of 3 input switches are hard wired (optically) as shown in FIG. 4 to a single input fiber of one of the three output switches. The net result is a 3×3 optical switch system. A 90×90 switch can be fabricated in the same manner using a 91 fiber bundles as shown in FIG. 2. By utilizing three stages a 8100×90 switch can be fabricated as shown in FIG. 5. This is referred as an $N^2 \times N$ switch.

N×N Switch

An N×N switch can be made from 1×N switch elements. These 1×N switches are arranged in two banks of N switch elements, for a total of 2N of these 1×N elements for each N×N switch (see FIG. 4 where N is 3). These two banks of switch elements are connected using a "Perfect Fiber Shuffle", which connects each 1×N switch element in the first bank to every 1×N switch element in the second bank. By symmetry, the converse is also true: each 1×N switch element in the second bank is connected to every 1×N switch element in the first bank. This allows any of the N input fibers to be connected to any of the N output fibers.

$N^2 \times N$ Switch

An $N^2 \times N$ switch can be made from 1×N switch elements. These 1×N switches are arranged in three banks of N switch elements, for a total of 3N of these 1×N elements for each $N^2 \times N$ switch (see FIG. 5). These three banks of switch elements are connected using "Perfect Fiber Shuffles", which connects each 1×N switch element in the first bank to every 1×N switch element in the second bank, and each 1×N switch element in the third bank to every 1×N switch element in the second bank. By symmetry, the converse is also true: each 1×N switch element in the second bank is connected to every 1×N switch element in the first bank, and each 1×N switch element in the second bank is connected to every 1×N switch element in the third bank. This allows any of the N input fibers to be connected to any of the N output fibers. In this topology, not all input fibers can be connected to an output fiber at the same time.

Routing

The 1×N switch elements described in this patent are able to route light from the input fiber to any of a plurality of output fibers. In addition, the input fiber can be also used as the output fiber, retro-reflecting light back along the path through which it came. More generally, it is possible to route incoming light from any one input fiber to any one output fiber. Most generally, a plurality of input fibers can be lit at any time, and the respective input signals routed as a group to a plurality of output fibers.

Design Considerations

This design also supports a variety of switch sizes by cascading architectures. For example, two stages of cascaded 1×90 will make 1×8,100 with 0.3 dB (2×0.15 dB) or 90×90 with 0.3 dB. The channel count grows further by using a CLOS architecture where a total of 6 stages of cascading realizes 8,100×8,100 with 0.9 dB (6×0.15 dB, ~81% throughput) insertion loss. This design also has some limitations.

Wavelength range limitations
    Limited by internal transmission of optics
    Limited by chromatic aberrations
    Limited by spectral range of coatings
Limitations related with the lens actuator
    Size
    Travel (~1 mm)
    Cost
    Operation temperature
    Speed
    Stability Tolerance Analysis Applicants have performed tolerance analyses. A macroscale lens shifts laterally to focus light from an input fiber to one of many possible output fibers. Lateral and axial misalignments of the fibers are considered, as is the sensitivity of the optical transmission efficiency to different wavelengths.

The movable single lens and single mirror are analyzed for its sensitivity to misalignment of the fiber bundle to the rest of the optical system. The input and output fibers with different core sizes were examined. The increase in output core size relative to the input core size results in greater optical throughput. Two different criteria for sizing the input/output cores are used. For each of these criteria, axial and lateral shifts as well as wavelength sensitivity (over the range of 400 nm to >900 nm) are analyzed.

Core Sizing

In preferred embodiments a three-stage switch matrix is assumed, meaning that there are three layers of M×N switches. Each of these three layers has an input side and an output side. Altogether, there are four different core sizes required:
1) input to the first layer of the switch,
2) output from the first layer/input to the second layer,
3) output from the second layer/input to the third layer, and
4) output from the third layer.

The minimum core diameter at the input of the system is assumed to be 50 μm, while the maximum allowable core diameter is assumed to be 150 μm.

In the first scenario, the core diameters are chosen to have the same ratio from input to output. In this case, the ratio chosen was. This gives the four fiber core sizes as 50 μm, 72 μm, 104 μm, and 150 μm.

In the second scenario, the core diameters are chosen to have the same in diameter from input to output instead of ratio. This gives the four fiber core sizes as 50 μm, 83 μm, 116 μm, and 150 μm. This offers slightly better performance based on the throughput criterion.

Based on these data, the scenario where the fibers core diameters are scaled by a constant number of microns shows better performance than the scenario where they are scaled by a constant ratio. Both designs were relatively insensitive to lateral and axial position shifts. However, both designs were very sensitive to wavelength. An achromatic lens will be required for adequate performance over the entire spectral range of the celestial selector.

APPLICATIONS

The present invention is very useful for analysis of astronomy data. The switch can also be applied as a multimode switch at a data center and for cross connecting optical equipment at data centers and for multiplexing.

While the above description contains many specifications, the reader should not construe these as limitations on the scope of invention, but merely as exemplifications of preferred embodiments thereof. Those skilled in the art will envision many other possible variations are within its scope. The switch of the present invention has many other applications that will be clear to persons skilled in the art such as a multi-mode switch at a data center and for cross connecting optical equipment at data centers and for multiplexing. Accordingly, the reader is requested to determine the scope of the invention by the appended claims and their legal equivalents, and not by the examples which have been given.

We claim:

1. A low cost, multimode optical fiber switch for connecting at least one single first directional multimode fiber to at least one plurality of second directional multimode fibers said multimode optical switch comprising:
   A) at least one multimode optical fiber bundle comprising:
      1) a single first directional multimode fiber and
      2) a plurality of second directional multimode fibers in said optical fiber bundle and surrounding said single first directional multimode fiber;
   B) at least one lens movable in a plane perpendicular to light beams from said single first directional multimode fiber and said plurality of second directional multimode fibers, said lens and said single directional fiber being adapted so that outgoing beams from said single first directional fiber is incident on said lens in a telecentric manner;
   C) a mirror positioned so as to reflect light from said single first directional multimode fiber into said plurality of second directional multimode fibers, one at a time; or to reflect light from said plurality of second directional multimode fibers into said single first directional multimode fiber, one at a time;
   D) lens position controls adapted to control directions of light beams passing to or from said single multimode fiber so as to optically connect said single first directional multimode fiber to said second directional multimode fibers one at a time.

2. The switch as in claim 1 wherein the single first directional multimode fiber is an output fiber and the plurality of second directional multimode fibers are input fibers.

3. The switch as in claim 1 wherein the single first directional multimode fiber is an input fiber and the plurality of second directional multimode fibers are output fibers.

4. The switch as in claim 1 wherein said switch is adapted to is used to serially reflect input light from a plurality of input optical fibers into a single output fiber or from a single optical fiber into a plurality of output fibers.

5. The switch as in claim 1 wherein the single first directional multimode fiber is located in the center of the plurality of second directional multimode fibers.

6. The switch as in claim 1 wherein the number of second directional multimode fibers is 6 or more.

7. The switch as in claim 1 wherein the number of second directional multimode fibers is 18 or more.

8. The switch as in claim 1 wherein the number of second directional multimode fibers is 36 or more.

9. The switch as in claim 1 wherein the number of second directional multimode fibers is 90 or more.

10. The switch as in claim 1 wherein said at least one single first directional multimode fiber and said at least one plurality of second directional multimode fibers is a plurality of single first directional multimode fiber and said at least one plurality of second directional multimode fibers is a plurality of second directional multimode fibers wherein said fibers of said bundles are arranged to permit communication between any of said first directional fibers one-a-a-time.

11. The switch as in claim 10 wherein the switch is adapted to reflect light from a number of second directional fibers one-at-a-time into a first directional fiber or to reflect light from a first directional fiber into a plurality of second directional fibers one-at-a-time.

12. The switch as in claim 11 wherein the plurality of second directional fibers is at least 8100 and the number of first directional fibers at least 90.

13. The switch as in claim 12 wherein each of the second directional fibers is adapted to supply light beams to a spectrometer.

14. The switch as in claim 13 wherein the switch is adapted to automatically monitor spectra of stars.

15. The switch as in claim 1 wherein a plurality of optical fiber bundles are arranged to provide an N×N optical fiber switch.

16. The switch as in claim 1 wherein a plurality of optical fiber bundles are arranged to provide an $N^2 \times N$ optical fiber switch.

17. The switch as in claim 1 wherein a plurality of optical fiber bundles are arranged to provide an $N^2 \times N^2$ optical fiber switch.

* * * * *